United States Patent [19]

Costanzo

[11] Patent Number: 5,692,830
[45] Date of Patent: Dec. 2, 1997

[54] ROTATING MIXER AND TRAY

[75] Inventor: Frank T. Costanzo, Phoenix, Ariz.

[73] Assignee: Coastal Sales Associates, Inc., Harriman, N.Y.

[21] Appl. No.: 695,316

[22] Filed: Aug. 9, 1996

[51] Int. Cl.[6] ............................................. A47J 43/046
[52] U.S. Cl. ............................................. 366/314; 366/349
[58] Field of Search .......................... 366/130, 199, 366/204–206, 314, 349

[56] References Cited

U.S. PATENT DOCUMENTS

| | | |
|---|---|---|
| 1,480,914 | 1/1924 | Poplawski. |
| 1,762,353 | 6/1930 | Robinson. |
| 1,824,929 | 9/1931 | Pritchard. |
| 2,757,909 | 8/1956 | Wayne. |
| 2,758,623 | 8/1956 | Malz et al.. |
| 2,771,111 | 11/1956 | Seyeried. |
| 2,804,289 | 8/1957 | Schwaneke. |
| 3,240,246 | 3/1966 | Dewenter. |
| 3,537,691 | 11/1970 | Tsuruta et al.. |
| 3,704,864 | 12/1972 | Lee. |
| 3,901,484 | 8/1975 | Ernster. |
| 4,664,530 | 5/1987 | Kurome et al.. |
| 4,946,286 | 8/1990 | Purkapile. |
| 5,044,758 | 9/1991 | Kurtz ................... 366/314 X |
| 5,353,697 | 10/1994 | Venturati et al. ........... 366/205 X |

FOREIGN PATENT DOCUMENTS 0 562 310 A1  2/1993  European Pat. Off..

*Primary Examiner*—Charles E. Cooley
*Attorney, Agent, or Firm*—Schmeiser, Olsen & Watts

[57] ABSTRACT

A rotating mixer for mixing drinks utilizes a tumbler-type container attached to a base and a rotatable whisk. The whisk is turned by rotatable gears, one of which is attached to a motor and one of which is attached to the base of the container. When the whisk rotates, its speed and shape create a tornado or whirlpool-like effect in the contents of the container. The motor is housed in a motor housing unit and is powered by rechargeable batteries, or, alternatively, by an AC adapter. The motor housing unit fits into a tray which is adapted for use as a serving tray and which also functions as a battery recharger when plugged into an electrical outlet. The tray comprises holders for holding one or more containers.

3 Claims, 3 Drawing Sheets

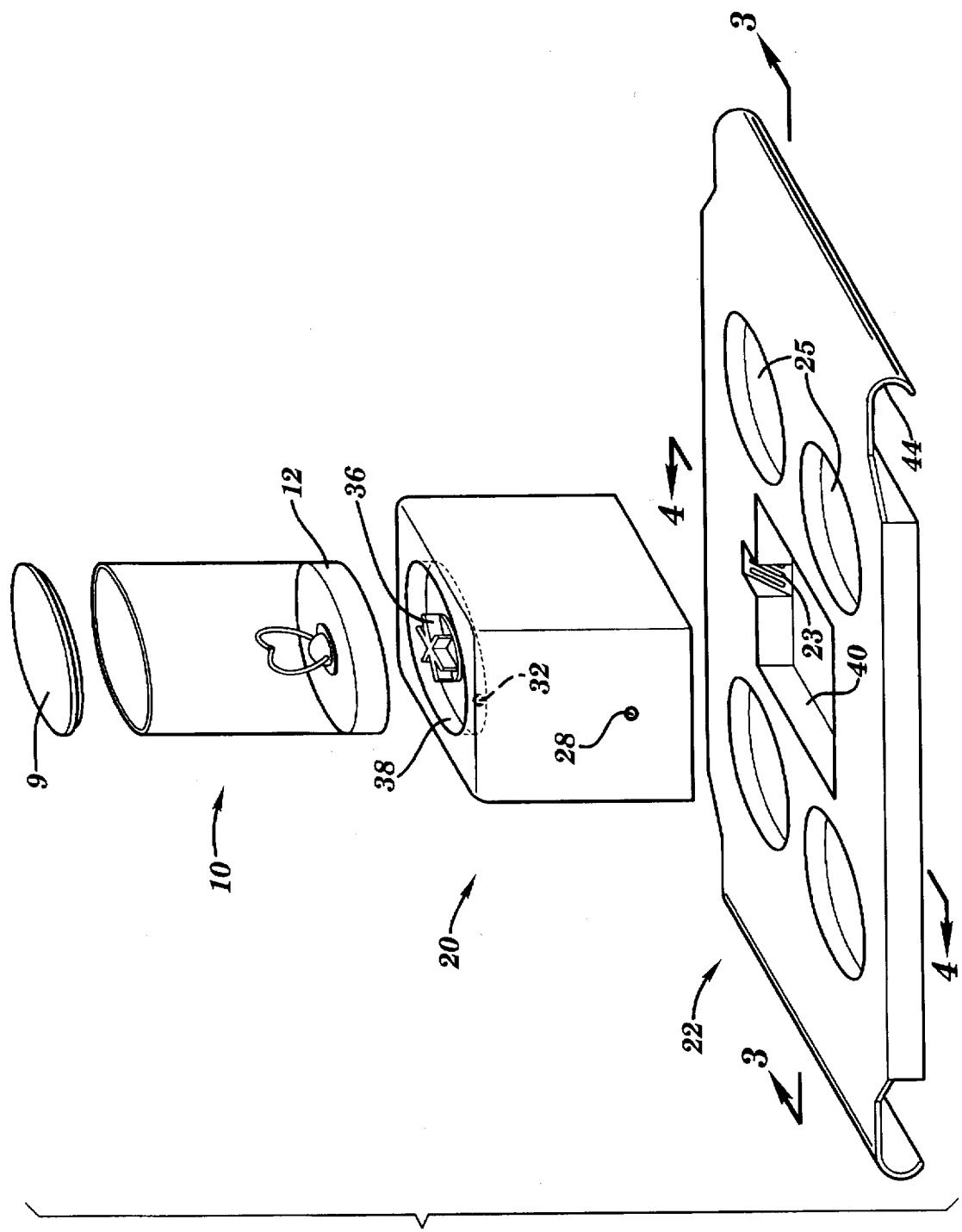

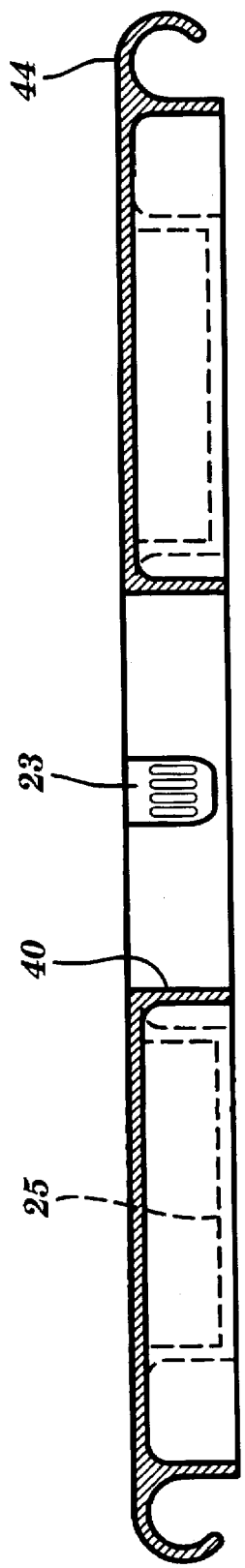
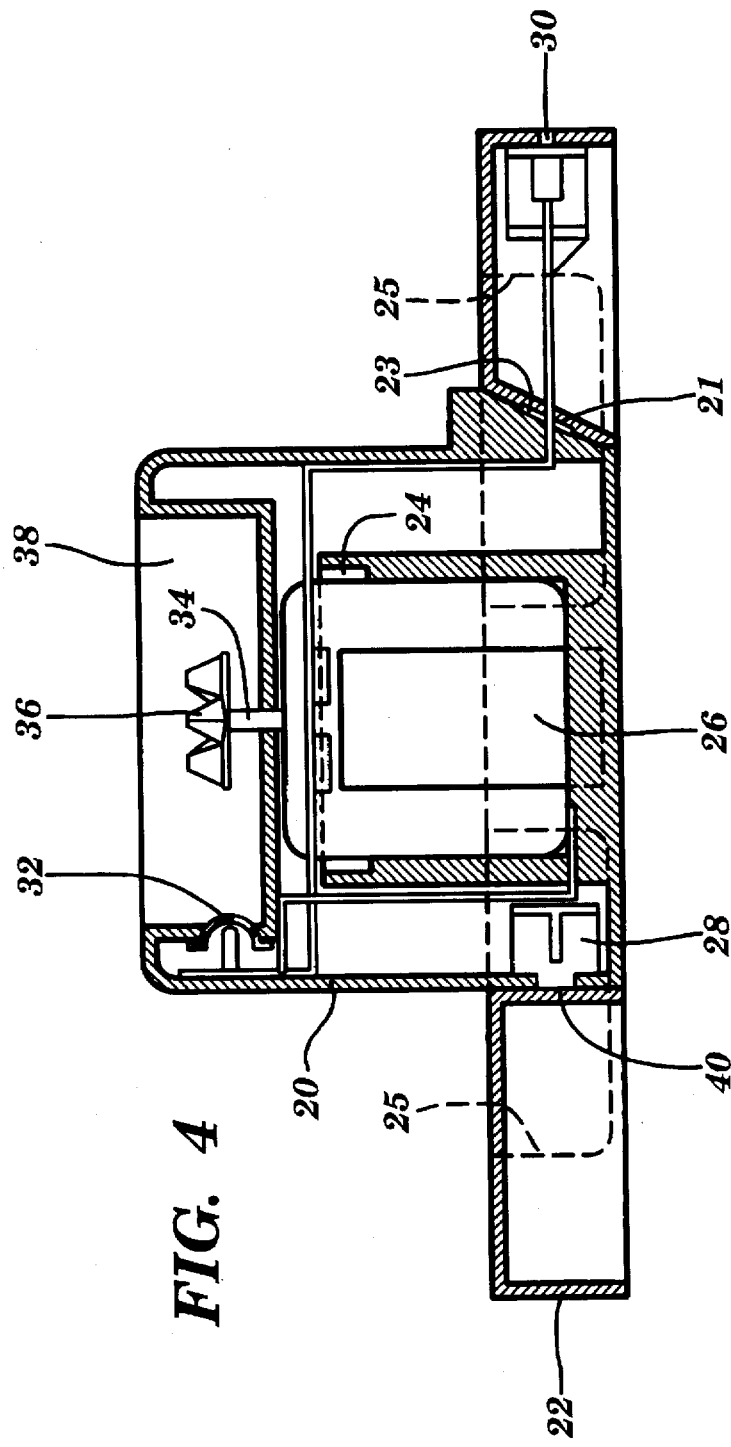

ROTATING MIXER AND TRAY

FIELD OF THE INVENTION

The present invention relates generally to mixing devices. More specifically, the present invention relates to improvements in free standing blender-type devices for mixing individual drinks and the like.

BACKGROUND OF THE INVENTION

Many drinks are made by combining several ingredients including fluids, powders and/or syrups. Manually stirring such drinks rarely produces a thorough combination. Instead, the heavier of the ingredients often concentrates at the bottom, while the lighter ingredients rise to the top. Shaking drinks may produce a more thorough combination than stirring, but still often fails to produce the desired result. Furthermore, since few containers are well adapted for either shaking or stirring, these tactics often increase spillage.

To address these problem, blenders and mixers of various sorts are sometimes used to more thoroughly combine ingredients added to a drink. Since blenders usually employ tight fitting lids, the problem of spillage is minimized. Furthermore, blenders mix their contents at faster speeds than stirring or shaking, thus producing a more thorough combination of the ingredients.

Blenders and other similar mixing devices have problems of their own however. Most blenders are larger than a single drink serving, thus necessitating that mixed contents be poured into separate containers (e.g., glasses) for serving. This creates the possibility of spillage as the drink or other fluid combination is poured from the blender or mixing device to a usually smaller container.

Furthermore, blenders separate the process of preparation from the processes of service and consumption. Thus, there is often enough lag time between mixing and consumption to allow the contents to settle and partially separate.

Blenders and other similar mixing devices also require the user to manually activate the blending mechanism. This may slow preparation time.

Finally, after the contents of the blender are transferred to another container, no further mixing can occur without re-transferring the drink back to the blender. Thus, even if a drink or other fluid mixture is immediately served after it is mixed, if it is not immediately consumed, some degree of settling and separation of the contents is bound to occur. This cannot be remedied without re-transferring the drink to the blender or other mixing device or resorting to another method for mixing drinks such as stirring or shaking.

Many blender-type mixing devices have been invented in attempting to address these problems. Among these are U.S. Pat. No. 1,762,353 to Robinson, U.S. Pat. No. 1,824,929 to Pritchard, U.S. Pat. No. 2,758,623 to Malz et al., U.S. Pat. No. 3,704,864 to Lee, and U.S. Pat. No. 4,946,286 to Purkapile and EPO 0 562 310 A1 issued to Schindlegger.

U.S. Pat. No. 1,762,353 to Robinson discloses a manually operable mixing device which provides a substantially cylindrical receptacle, with an open top and a blade-bearing agitator which is operable as a non-rotatable piston in the receptacle. The agitator consists essentially of a cover and a stem with a handle and a blade. The stem runs through a hole in the cover so that when the cover is in place on the receptacle the handle may be used to move the blade up and down, thus mixing the contents of the receptacle.

This device however, must be operated manually. Furthermore, once mixing is complete, the agitator and cover must be removed and the contents of the mixer transferred into serving containers. This increases spillage and necessitates additional clean-up because the blade and lower portion of the stem have been immersed in the contents of the receptacle and are very likely to drip when removed. Also, the step of transferring the contents from mixer to serving containers increases the likelihood of spillage.

U.S. Pat. No. 1,824,929 to Pritchard discloses a drink mixer which utilizes a tumbler or similar container for a mixing receptacle. The tumbler has a removable top with a central bearing orifice adapted to slidably receive the rod of the mixing device. On one end of the rod is a handle and on the other end of the rod is a mixing disc which may be dish formed.

Although this device provides for mixing contents within a container that may also be used for serving, thus eliminating the need for transferring contents from one container to another, it is still likely to create spillage when the mixing disc and cover are removed from the container. Because the mixing disc and the rod have been immersed in the contents of the container, spilling or dripping may occur when the rod and mixing dish are removed prior to serving the drink. Also, this device must be manually operated.

U.S. Pat. No. 2,758,623 to Malz et al. discloses a liquefier having a resiliently mounted motor and container. This liquefier device includes a base having an electric motor, and a container with cutting blades mounted on the bottom of its interior. Because of the motor, no manual operation is necessary. However, the problem of spillage still exists with this mixer because of the necessity of transferring the contents out of the container after mixing. Also, because the motor must be plugged in, portability of the device is limited.

U.S. Pat. No. 3,704,864 to Lee discloses a mixer unit which may be removably, sealingly affixed to the top of a receptacle containing the material to be mixed and the combination thereafter inverted during the mixing operation. Although this invention may be used with serving containers such as tumblers and it may be portable (i.e. battery powered), it still presents some problems. First, because the mixer unit is attached to the top of a receptacle, the receptacle must be inverted before the mixer unit functions properly. This creates a possibility of spillage because if the mixer is in any way improperly attached or if there is some sealing defect between the mixer unit and the receptacle, the contents of the receptacle will literally be dumped out when it is inverted. Second, even if no leakage or spillage occurs when the unit is inverted, there is likely to be some dripping or spilling when the unit is returned to its upright position and the mixing unit, which has been immersed in the contents during mixing, is removed.

U.S. Pat. No. 4,946,286 to Purkapile discloses a liquid pitcher including a removable lid and a rotary and reciprocal shaft journaled in the lid and having an apertured grinding and mixing plate attached to one end of the shaft. The grinding and mixing plate includes a plurality of mixing holes, four equally spaced semicircular rim segments, and a set of grinding teeth located on the underside thereof facing a set of fixed grinding teeth located in a row on the bottom of the pitcher with the two sets of teeth being mutually facing and interfitting. The mixer plate can be rotated to grind up frozen concentrate or reciprocated within the container to mix liquids therein. The holes in the aperture plate provide a mixing action in both the rotary and reciprocating modes of operation.

This device, by its nature, necessitates transfer of its contents to serving containers after mixing. Because the pitcher is constructed so as to facilitate pouring (i.e. it has a spout, etc.), spillage will probably not be a large problem, but still could be possible. The pitcher is portable, but must be manually operated. Furthermore, if it becomes desirable to re-mix a drink, the lid, shaft and mixing plate must be removed and the drink would have to be added back to the contents of the pitcher. Neither of these actions are ideal as removing the lid, shaft and mixing plate increases the likelihood of spillage, and re-introducing the drink to the pitcher could result in spreading germs.

EPO 0 562 310 A1 to Schindlegger discloses a mixing apparatus having a container and a variety of different shaped whisks. The Schindlegger patent uses a rotary drive to rotate a whisk within the container for mixing the drink.

Each of the devices discussed above possesses desirable features and advantages. However, none of them adequately address all of the problems discussed above relating to mixing devices for mixing drinks and the like. The references discussed above are hereby incorporated by reference.

SUMMARY OF THE INVENTION

The present invention provides an improvement upon free-standing blender devices for mixing individual drinks. This invention includes a single serving container having a tight fitting lid connected to a base with a rotating whisk. The container and base function as a single unit, which, in a preferred embodiment, are cylindrical in shape.

With the lid removed, the container looks and functions like a regular drinking glass. However, with the lid closed, the container and base may be placed in a motor housing unit containing a motor which rotates the whisk and mixes the contents of the container.

The motor housing unit runs on rechargeable batteries or may be plugged into an electrical outlet via an AC adapter. Alternatively, the motor housing unit can be set into a tray for recharging of the batteries. The tray is then connected to an electrical outlet via the AC adapter.

The tray is adapted such that it may be used to serve drinks, containing two handles and a number of holders, or indentations, of adequate size to hold single serving containers such as the one described above. As mentioned, the motor housing unit may be set into the tray, thus providing a portable system for mixing and serving drinks.

Furthermore, since the tray is adapted for serving drinks, it will often be readily available if it is desirable to re-mix a drink. Since the mixer is automatically activated by insertion of the serving container into the motor housing unit, a person wanting to mix or re-mix a drink needs only to cap the serving container and to insert it into the motor housing unit. Additionally, since drinks may be mixed and served within the container, spillage from transfer of the drink from one container to another is easily avoided.

Finally, because of the speed and shape of the rotatable whisk, this mixer, when operated produces a tornado or whirlpool-like effect as the contents are mixed. In a preferred embodiment when the container is fashioned from transparent material, this provides an entertaining visual effect.

It is therefore an advantage of the present invention to provide a rotating mixer which produces a thorough combination of its contents.

It is a further advantage of the present invention to provide a rotating mixer which minimizes spillage by using a single serving size container which also functions as a tumbler or drinking glass in order to avoid the need for transferring mixed contents from a mixing container to a drinking container.

It is a further advantage of the present invention to provide a portable mixing container, base, and serving tray which allows mixing of drinks immediately prior to consumption.

It is yet a further advantage of the present invention to provide a portable mixing container, base, and serving tray which allows easy, on-the-spot re-mixing of drinks if necessary, and allows drinks to be mixed without transferring the drink from the tumbler or drinking glass back to a mixing container.

It is therefore a further advantage of the present invention to provide a rechargeable motor housing unit which may be operated independently when charged, or which may be plugged into an electrical outlet either directly or via connection through a recharger tray.

It is therefore a further advantage of the present invention to provide a rotatable whisk that, because of its shape and speed of rotation, creates an entertaining tornado or whirlpool-like effect within the contents of the container.

It is therefore a further advantage of the present invention to provide a means for automatically stopping and starting rotation of the whisk with insertion of the container into the motor housing unit.

BRIEF DESCRIPTION OF THE DRAWINGS

These and other advantages of the present invention will become more apparent upon examination of the drawings wherein:

FIG. 2 is an exploded top perspective view of a preferred embodiment of the present invention.

FIG. 3 is a cross sectional view taken along lines 3—3 in FIG. 2.

FIG. 4 is a cross sectional view taken along lines 4—4 in FIG. 2.

Like numbers refer to like components consistently throughout the specification.

DETAILED DESCRIPTION OF THE PREFERRED EMBODIMENTS

Figure 1:
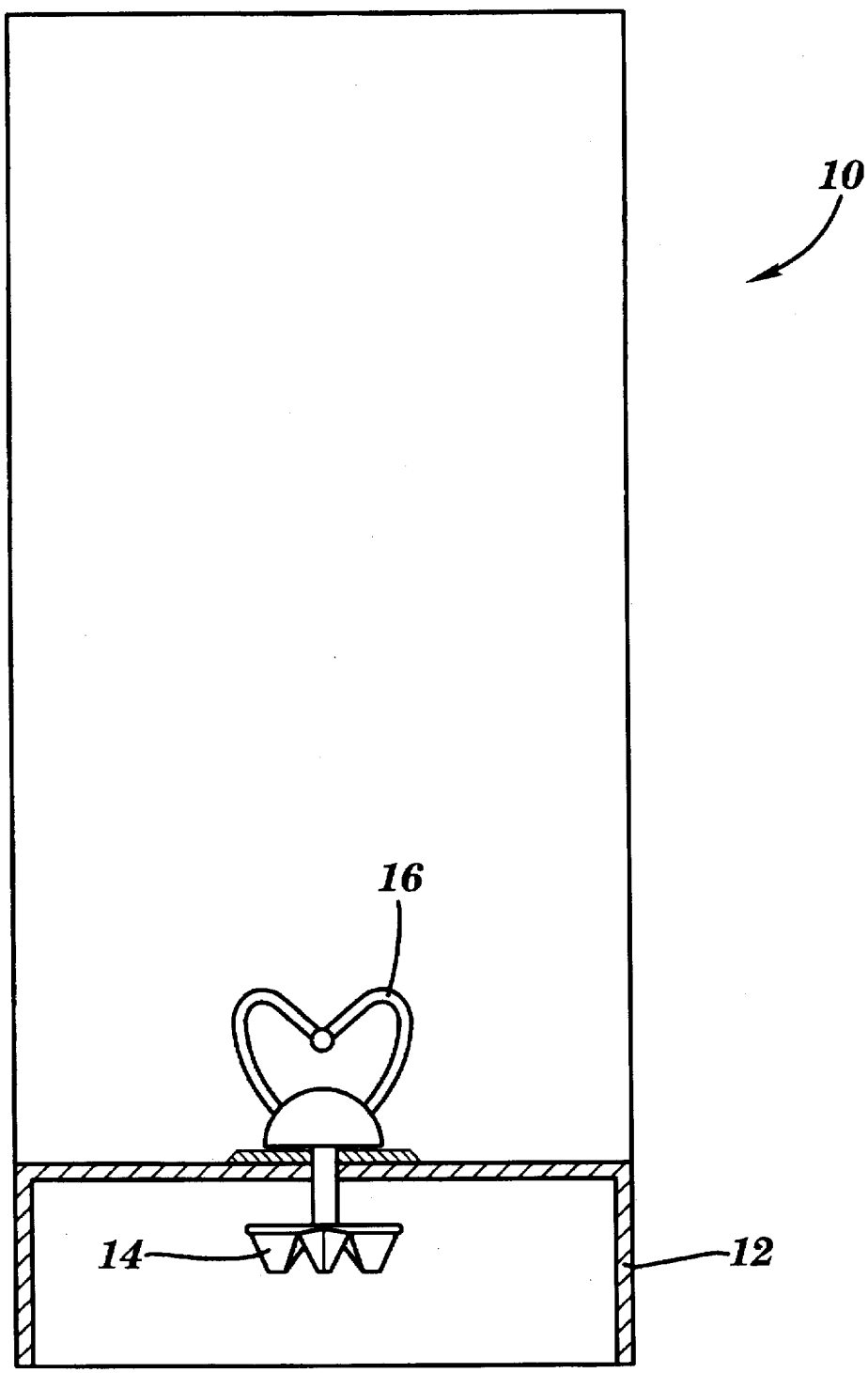
FIG. 1 is a front view of the first preferred embodiment of the container of the present invention.

Referring to FIG. 1, the container 10 is shown, in accordance with the first preferred embodiment of the present invention. The container is usually cylindrical in shape and is constructed from transparent material such as clear plastic. The base 12 of the container 10 is tightly attached and sealed so as to prevent leakage. The base has a recess underneath which houses a first gear 14. A whisk 16, which in one embodiment is substantially heart shaped, is attached by means of a shaft which extends through the base to a first gear 14 such that when the first gear 14 rotates the whisk 16 will also rotate.

Referring to FIG. 2, top perspective views of the container 10, motor housing unit 20 and tray 22 are shown, in accordance with a preferred embodiment of the present invention. The lid 9 is depicted, as is the container 10. The motor housing unit 20 provides a hollow space 38 which is adapted to receive the base 12 of the container 10. When the base 12 of the container 10 is inserted into the hollow space 38 of the motor housing unit 20, the flexible bubble switch 32 is depressed, thus activating the motor 24. The motor then rotates the shaft 34 (shown in FIG. 4), which rotates the second gear 36. Because the second gear 36 and the first gear 14 are engaged at this point, the first gear 14 is also rotated and the whisk, in turn, is also rotated. When the container 10 is detached from the motor housing unit 20, the pressure on the flexible bubble switch 32 is relieved, and the motor 24 is deactivated.

FIG. 2 also depicts the first jack 28, whereby the motor housing unit may be connected to an electrical outlet independent of the tray. The tray 22 is also shown in accordance with the first preferred embodiment of the present invention. A receptacle 40 is located in the tray for receiving the motor housing unit 20 into the tray 22. A plurality of holders 25 function to hold additional containers 10 after their contents have been mixed. In this embodiment, several handles 44 are included for grasping the tray 22. The second connecting means 23 for achieving an electrical connection is proximate the receptacle 40 for the motor housing unit 20. The first connecting means 21 (shown in FIG. 4) is positioned on the motor housing unit 20 so as to facilitate an electrically conductive pathway when the motor housing unit 20 and the tray 22 are in combination.

FIG. 3 depicts a cross sectional front view of the tray 22 at line 3—3. The second connecting means is shown here, as is the receptacle space 40 for the motor housing unit 20. The handles 44, and the tumbler holders 25 are also shown.

FIG. 4 depicts a cross sectional side view of the motor housing unit 20 at line 4—4. A cross sectional view of tray 22 at line 5—5 is also shown. The motor 24, may be powered by rechargeable batteries 26 or by an AC adapter which can be connected at a first jack 28 when the motor housing unit 20 is apart from the tray, or to second jack 30 when the motor housing unit 20 is set within the tray 22. In this figure the motor housing unit is removably sitting in the receptacle 40 of the tray 22. When the motor housing unit 20 and tray 22 are in combination, a first connecting means 21 positioned on the motor housing unit 20 creates an electrical connection with a second connecting means 23 on the tray 22.

The motor 24 is activated when bubble switch 32 is depressed as when the container 10 is positioned in the hollow space 38 of the motor housing unit 20. When activated, the motor 24 rotates a shaft 34. Attached to the shaft is a second gear 36 which interconnects with the first gear 14 to cause whisk 16 to rotate when the container is set in the hollow space 38 of the motor housing unit 20. Also depicted here are the tumbler holders 25, which are adapted to hold extra containers 10 while the tray is being carried or used.

While not shown in the drawings, it should be appreciated that other features might be added to the invention. For example, it may be possible to utilize a sensor to determine whether there is liquid within the container. The sensor would interact with the bubble switch 32 in order to enable the bubble switch only when liquid is sensed within the container. Such a switch could either sense the weight of the liquid within the container or could use a light sensor to determine if the container is empty.

The foregoing description of the preferred embodiments of this invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

What is claimed is:

1. A mixer and tray system comprising:
    a container having a bottom and a top;
    an opening in the top of said container;
    a whisk rotatably mounted in said container;
    a housing unit having a motor therein;
    said housing unit having a hollowed space adapted to receive the bottom of the container;
    means for connecting the whisk to the motor when the container is fitted into the hollowed space whereby said whisk is rotated when the motor is activated;
    a switch set into said housing movable between a quiescent state wherein the motor is deactivated and a depressed state wherein the motor is activated;
    a tray;
    a receptacle in said tray for receiving the housing unit; and
    a plurality of holders in said tray each for receiving said container.

2. The invention of claim 1, wherein the housing unit further comprises a first electrical connector for powering the motor, said tray having a jack communicating with a second electrical connector also on said tray, said first and second connectors forming an electrically conductive pathway when the housing unit is in the tray receptacle, whereby a power source may be attached to the jack for powering the motor.

3. The invention of claim 1, wherein said switch is moved from its quiescent state to its depressed state as the container is inserted into the hollowed space in the housing.

* * * * *